US010966273B2

(12) United States Patent
Mitsuhashi

(10) Patent No.: US 10,966,273 B2
(45) Date of Patent: Mar. 30, 2021

(54) CONNECTION MANAGEMENT APPARATUS AND NON-TRANSITORY COMPUTER READABLE MEDIUM

(71) Applicant: FUJI XEROX CO., LTD., Tokyo (JP)

(72) Inventor: Hiroyuki Mitsuhashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/556,186

(22) Filed: Aug. 29, 2019

(65) Prior Publication Data

US 2020/0305215 A1 Sep. 24, 2020

(30) Foreign Application Priority Data

Mar. 20, 2019 (JP) .............................. JP2019-053824

(51) Int. Cl.
| | |
|---|---|
| *H04W 76/18* | (2018.01) |
| *H04W 52/38* | (2009.01) |
| *H04W 84/20* | (2009.01) |
| *H04W 84/12* | (2009.01) |
| *H04W 48/20* | (2009.01) |

(52) U.S. Cl.
CPC ........... *H04W 76/18* (2018.02); *H04W 52/38* (2013.01); *H04W 48/20* (2013.01); *H04W 84/12* (2013.01); *H04W 84/20* (2013.01)

(58) Field of Classification Search
CPC ..... H04W 76/18; H04W 52/38; H04W 48/20; H04W 84/20; H04W 84/12
See application file for complete search history.

(56) References Cited

U.S. PATENT DOCUMENTS

| 10,051,533 | B2 * | 8/2018 | Fitzpatrick | ............ H04W 36/04 |
| 10,136,471 | B2 | 11/2018 | Shibata et al. | |
| 10,187,128 | B2 * | 1/2019 | Bilotta | ................. H04B 7/0413 |
| 10,219,284 | B2 * | 2/2019 | Farhadi | ............... H04W 52/386 |

(Continued)

FOREIGN PATENT DOCUMENTS

| JP | 2018-107778 | 7/2018 |
| JP | 2018-125774 | 8/2018 |

*Primary Examiner* — Brian T O Connor
(74) *Attorney, Agent, or Firm* — JCIPRNET

(57) ABSTRACT

A connection management apparatus includes an accepting section, a transmitting section, a connecting section, and a control section. The accepting section accepts an information transmission request from a requesting terminal that is a terminal requesting a wireless LAN connection. The transmitting section transmits, to the requesting terminal, connection information for establishing a wireless LAN connection in response to the information transmission request. The connecting section has a capability of establishing a wireless LAN connection with a predetermined upper limit number of terminals. In a case where the number of connecting terminals that are terminals connected via the wireless LAN connection reaches the upper limit number, the control section causes a connecting terminal among the connecting terminals to function as a tethering terminal and terminates the wireless LAN connection established by the connecting section, the tethering terminal being a terminal that provides a tethering connection using connection information the same as the connection information for establishing the wireless LAN connection with the connecting section by the connecting terminal.

16 Claims, 12 Drawing Sheets

(56) References Cited

U.S. PATENT DOCUMENTS

| | | | |
|---|---|---|---|
| 2008/0159242 A1* | 7/2008 | Rayzman | H04W 84/12 370/338 |
| 2015/0215832 A1* | 7/2015 | Fitzpatrick | H04W 48/14 455/426.1 |
| 2015/0282195 A1* | 10/2015 | Farhadi | H04W 52/143 370/229 |
| 2017/0367096 A1* | 12/2017 | Park | H04L 5/0091 |
| 2018/0199215 A1* | 7/2018 | Patil | H04L 1/0003 |
| 2018/0217789 A1 | 8/2018 | Tsuji et al. | |
| 2018/0337711 A1* | 11/2018 | Bilotta | H04B 7/0413 |
| 2020/0053774 A1* | 2/2020 | Inoki | H04W 48/18 |
| 2020/0169894 A1* | 5/2020 | Dillon | H04W 16/14 |

* cited by examiner

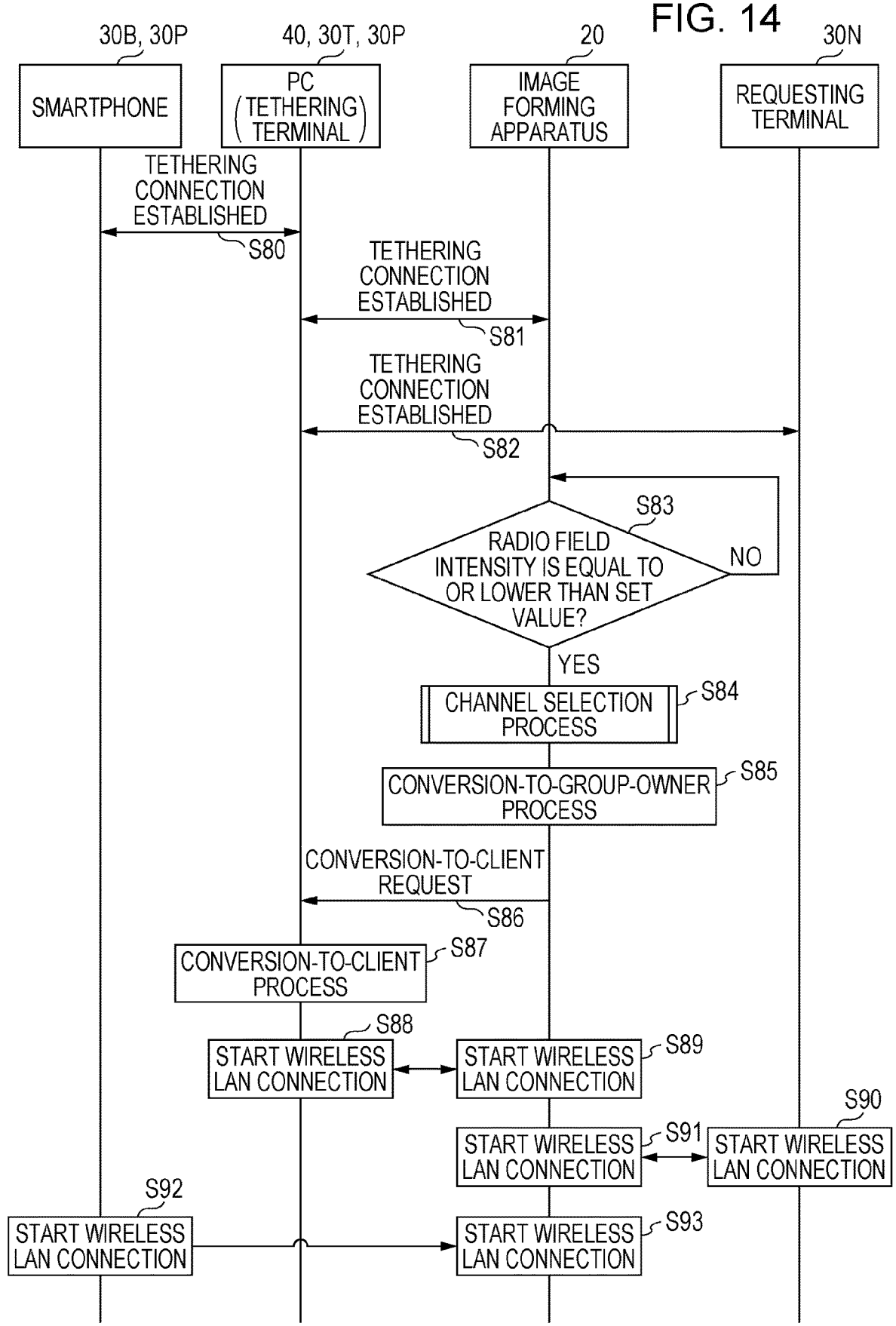

CONNECTION MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053824 filed Mar. 20, 2019.

BACKGROUND

(i) Technical Field

The present disclosure relates to a connection management apparatus and a non-transitory computer readable medium.

(ii) Related Art

Japanese Unexamined Patent Application Publication No. 2018-107778 discloses a technique for making a communication apparatus and an external apparatus belong to the same wireless network in a state where the communication apparatus is operating as a master station.

The communication apparatus described in Japanese Unexamined Patent Application Publication No. 2018-107778 includes a first wireless interface; a first transition unit that, in a first state where the communication apparatus is operating as a master station of a first wireless network, in a case where predetermined communication with an external apparatus, which is an apparatus not belonging to the first wireless network, is performed, makes the operation state of the communication apparatus transition from a master station state for operating as the master station of the first wireless network to a specific state different from the master station state; and an establishing unit that, after the operation state of the communication apparatus has transitioned to the specific state, establishes, via the first wireless interface, a first wireless connection with the external apparatus that operates as a master station of a second wireless network and makes the communication apparatus participate in the second wireless network as a slave station.

SUMMARY

An upper limit may be set for the number of terminals that are allowed to make a wireless connection with a device, such as the communication apparatus in Japanese Unexamined Patent Application Publication No. 2018-107778. Once a wireless connection is established, the connection may be maintained without disconnection even if the use of the device ends, or a reconnection may be made after disconnection regardless of the user's intention by using connection information saved in the terminal. Therefore, a terminal attempting to newly make a wireless connection with the device that already establishes a wireless connection with the upper limit number of terminals fails to make a wireless connection.

Aspects of non-limiting embodiments of the present disclosure relate to providing a connection management apparatus that, even in a case where an upper limit is set for the number of terminals that are allowed to make a wireless local area network (LAN) connection, makes establishment of a connection by a new terminal in addition to already-connecting terminals easier than in a case where a connection with the new terminal is made by using different connection information.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a connection management apparatus including an accepting section, a transmitting section, a connecting section, and a control section. The accepting section accepts an information transmission request from a requesting terminal that is a terminal requesting a wireless LAN connection. The transmitting section transmits, to the requesting terminal, connection information for establishing a wireless LAN connection in response to the information transmission request. The connecting section has a capability of establishing a wireless LAN connection with a predetermined upper limit number of terminals. In a case where the number of connecting terminals that are terminals connected via the wireless LAN connection reaches the upper limit number, the control section causes a connecting terminal among the connecting terminals to function as a tethering terminal and terminates the wireless LAN connection established by the connecting section, the tethering terminal being a terminal that provides a tethering connection using connection information the same as the connection information for establishing the wireless LAN connection with the connecting section by the connecting terminal.

BRIEF DESCRIPTION OF THE DRAWINGS

An exemplary embodiment of the present disclosure will be described in detail based on the following figures, wherein:

FIG. 1A illustrates a state where two smartphones and one personal computer (PC) establish a wireless LAN connection and FIG. 1B illustrates a state where a tethering connection with each terminal is established;

FIG. 14 is a sequence chart illustrating example roaming in a case where the radio field intensity of a tethering connection decreases.

DETAILED DESCRIPTION

Hereinafter, an image processing system to which a connection management apparatus according to an exemplary embodiment of the present disclosure is applied will be described with reference to the drawings.

Image Processing System

Figure 1A:
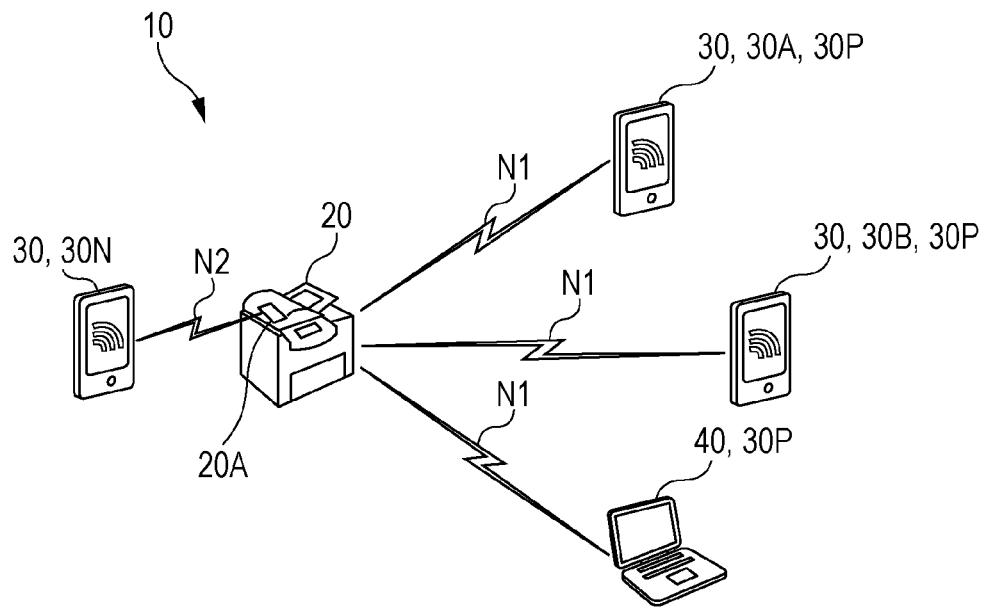
FIGS. 1A and 1B are schematic diagrams illustrating a configuration of an image processing system according to an exemplary embodiment, where

As illustrated in FIG. 1A, an image processing system 10 according to the exemplary embodiment includes an image forming apparatus 20, a plurality of smartphones 30, and a PC 40. The image forming apparatus 20 is an example of the connection management apparatus, and the smartphones 30 and the PC 40 are examples of terminals.

The image forming apparatus 20, each smartphone 30, and the PC 40 are able to make a wireless LAN connection using Wi-Fi (registered trademark). The image forming apparatus 20 of the exemplary embodiment conforms to Wi-Fi Direct (registered trademark). That is, when the image forming apparatus 20 is set as an access point, the smartphones 30 and the PC 40 are directly connected without a router. A network N1 represents a wireless LAN connection using Wi-Fi Direct.

The image forming apparatus 20 and each smartphone 30 are able to be connected to each other using near-field communication (NFC). When the smartphone 30 is in close vicinity of an NFC portion 20A on the upper surface of the image forming apparatus 20, an NFC connection is established with an NFC interface (I/F) 24 described below. A network N2 represents a connection using NFC.

As illustrated in FIG. 1A, in the exemplary embodiment, to the image forming apparatus 20, two smartphones 30 (specifically, smartphones 30A and 30B) and one PC 40 are already connected via the network N1. In the exemplary embodiment, the smartphones 30A and 30B and the PC 40 directly connected to the image forming apparatus 20 each correspond to a connecting terminal 30P. For the network N1, the number of terminals that are allowed to make a connection is set in advance. In the exemplary embodiment, an upper limit number of terminals that are allowed to make a connection with the network N1 is three, and three connecting terminals 30P are already connected to the network N1. Therefore, the smartphone 30, which is a requesting terminal 30N newly requesting a wireless LAN connection, fails to make a connection with the network N1.

Figure 1B:
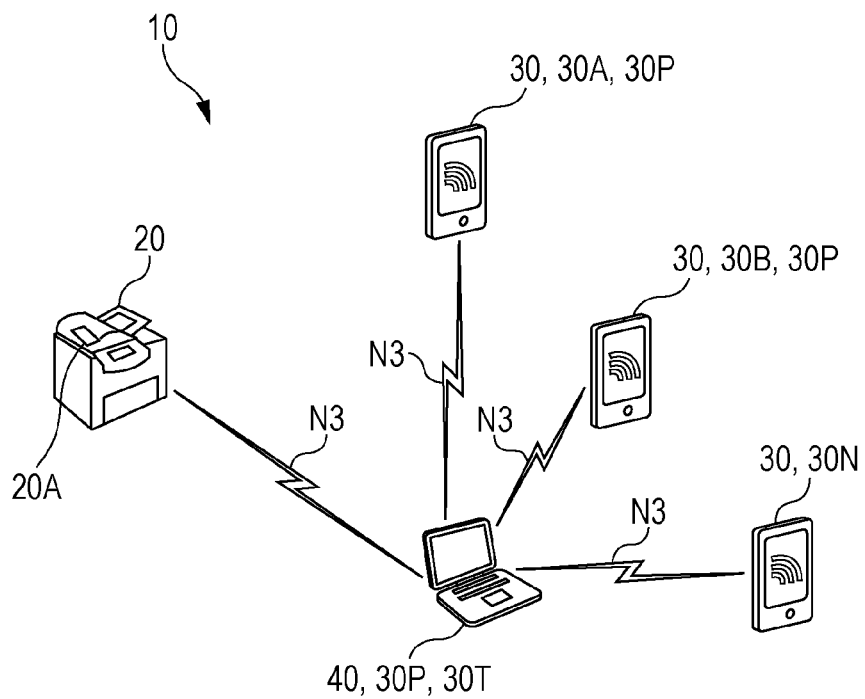

Accordingly, in the exemplary embodiment, as illustrated in FIG. 1B, at least one of the smartphones 30A and 30B and the PC 40, which are the connecting terminals 30P already establishing a connection, is set as a tethering terminal 30T, and each terminal is configured so as to be able to make a connection with the tethering terminal 30T. In the exemplary embodiment, the PC 40 corresponds to the tethering terminal 30T. A network N3 represents a tethering connection using Wi-Fi in which the tethering terminal 30T functions as an access point. The frequency band of the network N1 and that of the network N3 are made to match.

Image Forming Apparatus

The image forming apparatus 20 is an apparatus that forms images on recording media, such as sheets, on the basis of print jobs from the smartphones 30 and the PC 40.

Figure 2:
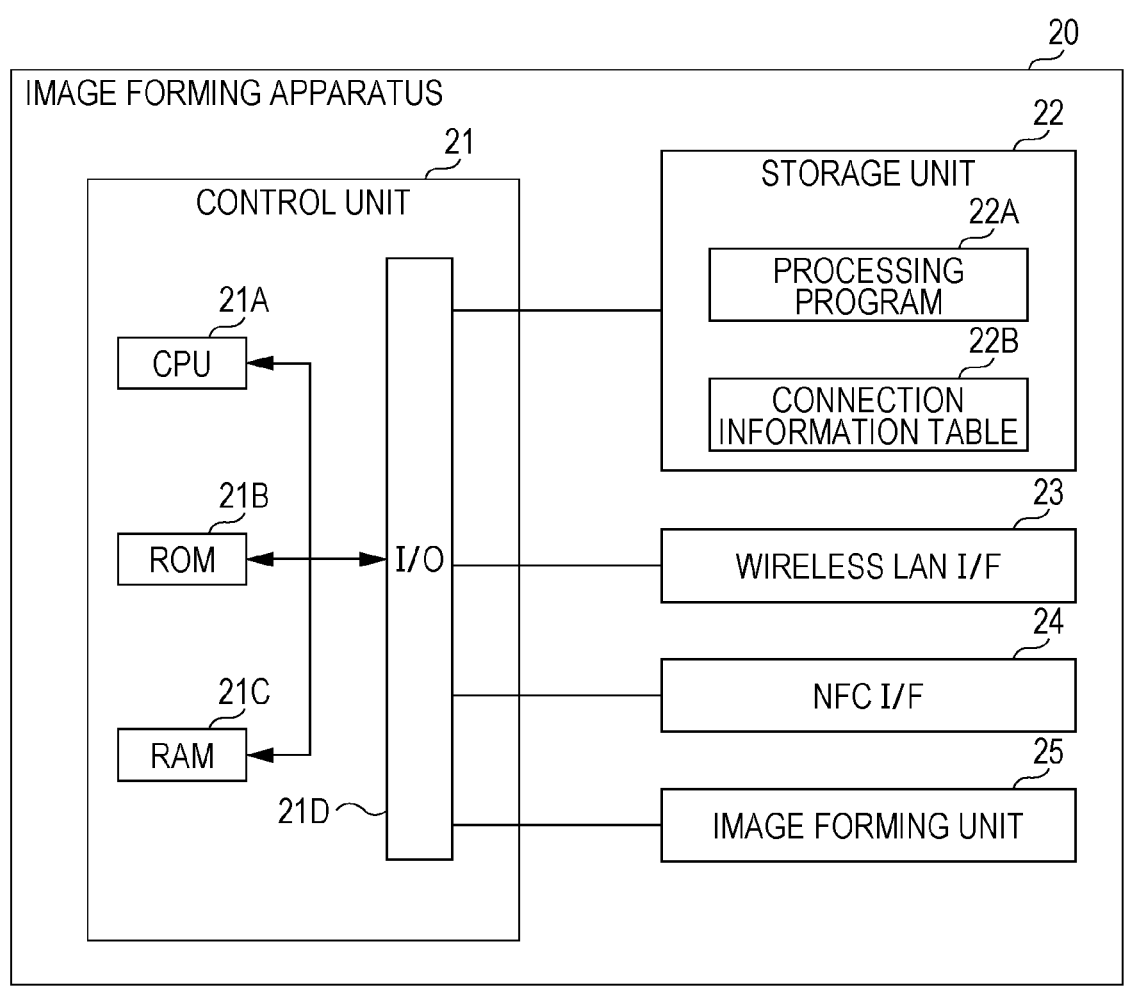
FIG. 2 is a block diagram illustrating a hardware configuration of an image forming apparatus according to the exemplary embodiment.

FIG. 2 is a block diagram illustrating an example hardware configuration of the image forming apparatus 20 according to the exemplary embodiment.

As illustrated in FIG. 2, the image forming apparatus 20 of the exemplary embodiment includes a control unit 21, a storage unit 22, a wireless LAN I/F 23, the NFC I/F 24, and an image forming unit 25.

The control unit 21 includes a central processing unit (CPU) 21A, a read-only memory (ROM) 21B, a random access memory (RAM) 21C, and an input/output interface (I/O) 21D, and these units are connected to one another via a bus.

To the I/O 21D, functional units including the storage unit 22, the wireless LAN I/F 23, the NFC I/F 24, and the image forming unit 25 are connected. These functional units are able to communicate with the CPU 21A via the I/O 21D.

The control unit 21 may be configured as a sub-control unit that controls part of the operation of the image forming apparatus 20 or may be configured as part of a main control unit that controls the entire operation of the image forming apparatus 20.

As the storage unit 22, for example, a solid state drive (SSD) or a flash memory is used. In the storage unit 22, a processing program 22A for performing processes concerning the exemplary embodiment and a connection information table 22B concerning each connecting terminal 30P are stored. The processing program 22A and the connection information table 22B may be stored in the ROM 21B.

In the connection information table 22B, information (for example, a universally unique identifier (UUID)) of the connecting terminal 30P that establishes a wireless LAN connection with the image forming apparatus 20 is kept. In the connection information table 22B, information indicating the channel state of each connecting terminal 30P is kept. The channel state kept in the connection information table 22B is obtained by measurement made by a communication measurement section 203 described below.

The channel state kept in the connection information table 22B includes at least one of the following conditions (1) to (4). As the channel state, a single condition may be kept or a plurality of conditions may be combined and kept.

(1) The distance from the image forming apparatus 20 to the connecting terminal 30P (2) The radio field intensity of the wireless LAN connection between the image forming apparatus 20 and the connecting terminal 30P (3) The communication speed of the wireless LAN connection between the image forming apparatus 20 and the connecting terminal 30P (4) The number of terminals for which a tethering connection is allowed in a case where the connecting terminal 30P is set as a tethering terminal The wireless LAN I/F 23 has a function of wirelessly communicating with the smartphones 30 and the PC 40 by using Wi-Fi Direct. The wireless LAN I/F 23 further has a function of wirelessly communicating with the tethering terminal 30T by using Wi-Fi. The wireless LAN I/F 23 includes a wireless communication antenna and functions as a communication interface for transmitting/receiving various types of data to/from the smartphones 30 and the PC 40.

The NFC I/F 24 has a function of wirelessly communicating with the smartphones 30 having an NFC function by using NFC. The NFC I/F 24 includes a wireless communication antenna and functions as a communication interface for transmitting/receiving various types of data to/from the smartphones 30.

The image forming unit 25 forms an image based on image information obtained from any smartphone 30 or the PC 40 or image information obtained by reading performed by a document reader (not illustrated) on a recording medium, such as paper. As the system for forming an image, for example, an electrophotographic system or an inkjet system is employed.

Figure 3:
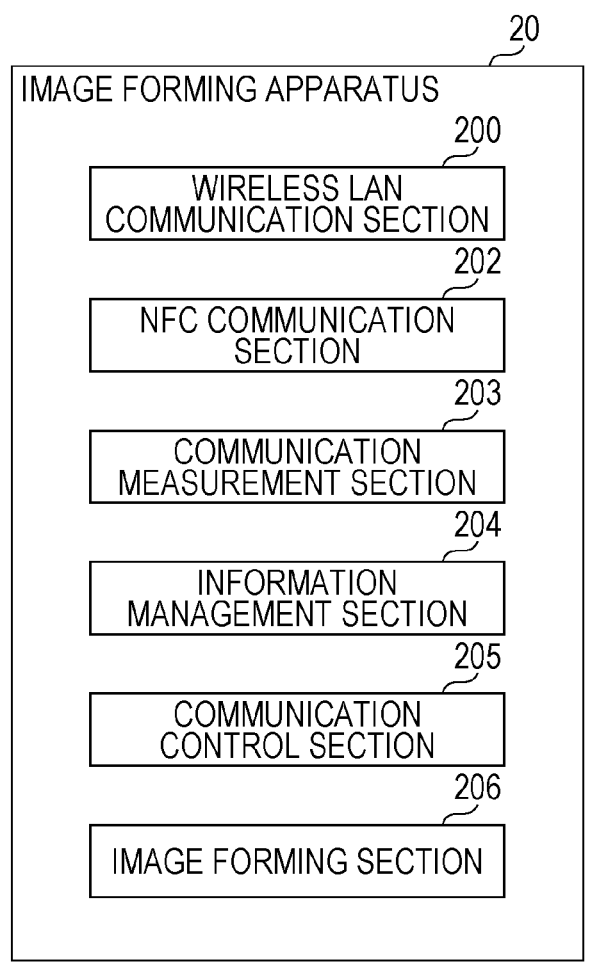
FIG. 3 is a block diagram illustrating an example functional configuration of the image forming apparatus according to the exemplary embodiment.

FIG. 3 is a block diagram illustrating an example functional configuration of the image forming apparatus 20 according to the exemplary embodiment. The image forming apparatus 20 according to the exemplary embodiment functions as a wireless LAN communication section 200, an NFC communication section 202, the communication measurement section 203, an information management section 204, a communication control section 205, and an image forming section 206. In the image forming apparatus 20, the CPU 21A reads the processing program 22A stored in the storage unit 22 and executes the processing program 22A while using the RAM 21C as a work area to function as the sections illustrated in FIG. 3. The wireless LAN communication section 200 is an example of a connecting section, the NFC communication section 202 is an example of a transmitting section, the communication measurement section 203 is an example of a measurement section, the information management section 204 is an example of an accepting section, and the communication control section 205 is an example of a control section.

The wireless LAN communication section 200 has a function of establishing a wireless LAN connection with terminals including the smartphones 30 and the PC 40 and communicating with a predetermined upper limit number of terminals. In response to a wireless LAN connection request from a terminal using a service set identifier (SSID) and a password, the wireless LAN communication section 200 of the exemplary embodiment establishes a wireless LAN connection with the terminal in a case where the SSID and password are verified. The SSID and password are examples of connection information. The connection information is information that is used in establishing a wireless LAN connection.

The wireless LAN communication section 200 further has a function of establishing a tethering connection with the tethering terminal 30T and communicating with the tethering terminal 30T. In this case, the image forming apparatus 20 functions as one of the terminals connected to the tethering terminal 30T that functions as an access point. In the exemplary embodiment, an SSID and a password the same as the SSID and password for establishing a wireless LAN connection by the image forming apparatus 20 are used to provide a tethering connection by the tethering terminal 30T.

The NFC communication section 202 has a function of establishing an NFC connection with the smartphone 30, responding to an information transmission request from the smartphone 30, and transmitting, to the smartphone 30, the SSID and password that are to be used in establishing a wireless LAN connection or a tethering connection. When the smartphone 30 including an NFC I/F 34 described below is in close vicinity of the NFC portion 20A, the NFC communication section 202 of the exemplary embodiment receives an information transmission request from the smartphone 30 and transmits the SSID and password for making a connection with the image forming apparatus 20 to the smartphone 30.

The communication measurement section 203 has a function of measuring the channel state of each connecting terminal 30P connected to the image forming apparatus 20. As described above, the channel state measurable by the communication measurement section 203 includes the conditions (1) to (4) described above.

The information management section 204 has a function of accepting an information transmission request from a terminal for which an NFC connection is established and selecting an SSID and a password for making a wireless LAN connection with the image forming apparatus 20 or making a tethering connection with the tethering terminal 30T.

The communication control section 205 has a function of, in a case where the number of connecting terminals 30P connected via a wireless LAN connection reaches the upper limit, causing at least one of the connecting terminals 30P to function as the tethering terminal 30T and terminating the wireless LAN connection by the wireless LAN communication section 200.

In the case where the number of connecting terminals 30P reaches the upper limit, the communication control section 205 of the exemplary embodiment causes the connecting terminal 30P for which the channel state measured by the communication measurement section 203 is most favorable to function as the tethering terminal 30T. Specifically, on the basis of the connection information table 22B, the communication control section 205 causes the connecting terminal 30P having the most favorable channel state to function as the tethering terminal 30T.

In a case where the radio field intensity of the tethering connection by the tethering terminal 30T decreases to a predetermined value or lower, the communication control section 205 performs control in one of the following cases. In a first case, the communication control section 205 terminates the tethering connection by the tethering terminal 30T and resumes the wireless LAN connection by the wireless LAN communication section 200. In a second case, the communication control section 205 replaces the tethering terminal 30T currently providing the tethering connection by another terminal connected to the tethering connection and causes the other terminal to function as a new tethering terminal 30T.

The communication control section 205 further causes a conversion-to-client process to be performed in the image forming apparatus 20 or in the tethering terminal 30T. In the conversion-to-client process, the image forming apparatus 20 or the tethering terminal 30T terminates provision of a wireless connection, which is the wireless LAN connection or the tethering connection, in which the image forming apparatus 20 or the tethering terminal 30T functions as a router, and functions as a client. In a case of the conversion-to-client process in the image forming apparatus 20, the communication control section 205 makes the radio field intensity of the wireless LAN connection provided by the image forming apparatus 20 decrease over time. In a case of the conversion-to-client process in the tethering terminal 30T, the communication control section 205 makes the radio field intensity of the tethering connection provided by the tethering terminal 30T decrease over time.

The image forming section 206 has a function of performing an image forming process for forming an image on a recording medium, such as a sheet, on the basis of a print job received from any smartphone 30 or the PC 40. In a case where the image forming process based on the print job is completed, the image forming section 206 notifies the smartphone 30 or the PC 40 of job completion.

Smartphone

The smartphone 30 is a portable terminal owned by a user.

Figure 4:
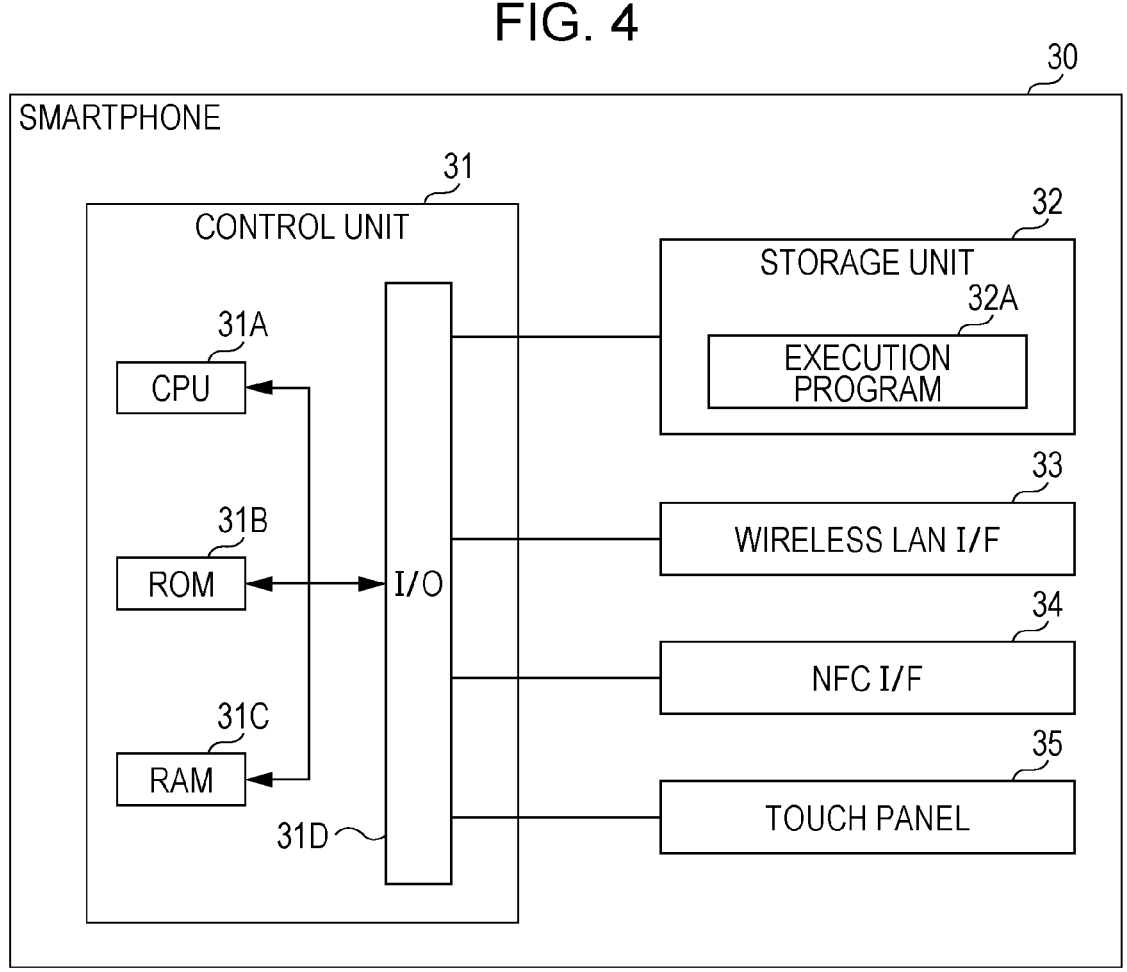
FIG. 4 is a block diagram illustrating a hardware configuration of a smartphone according to the exemplary embodiment.

FIG. 4 is a block diagram illustrating an example hardware configuration of the smartphone 30 according to the exemplary embodiment.

As illustrated in FIG. 4, the smartphone 30 of the exemplary embodiment includes a control unit 31, a storage unit 32, a wireless LAN I/F 33, the NFC I/F 34, and a touch panel 35.

The control unit 31 includes a CPU 31A, a ROM 31B, a RAM 31C, and an I/O 31D, and these units are connected to one another via a bus.

To the I/O 31D, functional units including the storage unit 32, the wireless LAN I/F 33, the NFC I/F 34, and the touch panel 35 are connected. These functional units are able to communicate with the CPU 31A via the I/O 31D.

The control unit 31 may be configured as a sub-control unit that controls part of the operation of the smartphone 30 or may be configured as part of a main control unit that controls the entire operation of the smartphone 30.

As the storage unit 32, for example, an SSD or a flash memory is used. In the storage unit 32, an execution program 32A for performing various processes is stored. The execution program 32A may be stored in the ROM 31B.

The wireless LAN I/F 33 has a function of wirelessly communicating with the image forming apparatus 20 by using Wi-Fi Direct. The wireless LAN I/F 33 further has a function of wirelessly communicating with the tethering terminal 30T by using Wi-Fi. The wireless LAN I/F 33 includes a wireless communication antenna and functions as a communication interface for transmitting/receiving various types of data to/from the image forming apparatus 20 and the other smartphones 30.

The NFC I/F 34 has a function of wirelessly communicating with the image forming apparatus 20 by using NFC. The NFC I/F 34 includes a wireless communication antenna and functions as a communication interface for transmitting/receiving various types of data to/from the image forming apparatus 20.

The touch panel 35 is a combination of a display device, such as a liquid crystal display (LCD) or an organic electroluminescence (EL) display, and a touch sensor of a resistive-film type or a capacitive type. On the touch panel 35, various operations may be performed by the user touching a button or an icon on the screen. In the touch panel 35, the operation unit and the display device may be separated from each other.

Figure 5:
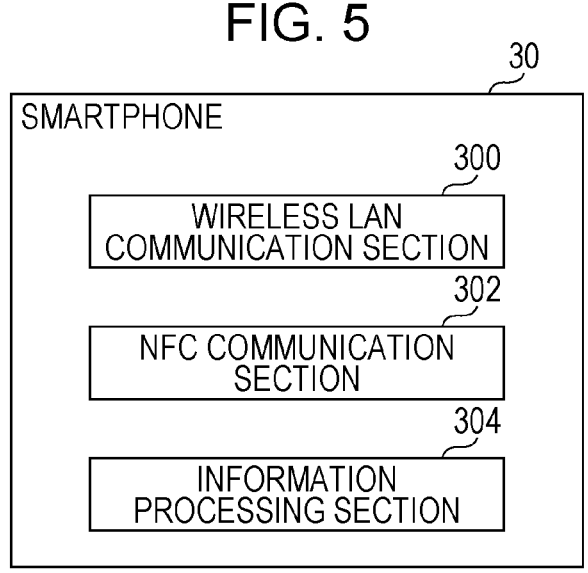
FIG. 5 is a block diagram illustrating an example functional configuration of the smartphone according to the exemplary embodiment.

FIG. 5 is a block diagram illustrating an example functional configuration of the smartphone 30 according to the exemplary embodiment. The smartphone 30 according to the exemplary embodiment functions as a wireless LAN communication section 300, an NFC communication section 302, and an information processing section 304. In the smartphone 30, the CPU 31A reads the execution program 32A stored in the storage unit 32 and executes the execution program 32A while using the RAM 31C as a work area to function as the sections illustrated in FIG. 5.

The wireless LAN communication section 300 has a function of making a wireless LAN connection request by using an SSID and a password obtained from the image forming apparatus 20 and establishing a wireless LAN connection with the image forming apparatus 20. The wireless LAN communication section 300 further has a function of establishing a tethering connection with the tethering terminal 30T. In the exemplary embodiment, the SSID and password used in a wireless LAN connection and a tethering connection are automatically obtained via the NFC communication section 302; however, the SSID and password may be obtained in response to a user's input operation performed on the touch panel 35.

The NFC communication section 302 has a function of making an information transmission request to the image forming apparatus 20 by using identification information (for example, the UUID) of the smartphone 30 and obtaining an SSID and a password from the image forming apparatus 20. The obtained SSID and password are common SSID and password used in a wireless LAN connection and in a tethering connection.

The information processing section 304 has a function of performing various processes in the smartphone 30. For example, the information processing section 304 has a function of generating a print job on the basis of an operation performed by the user on the touch panel 35. For example, the information processing section 304 further has a function of displaying, in a case where a wireless LAN connection with the image forming apparatus 20 is established, the state of the wireless LAN connection on the touch panel 35.

PC

The PC 40 is a terminal owned by a user.

Figure 6:
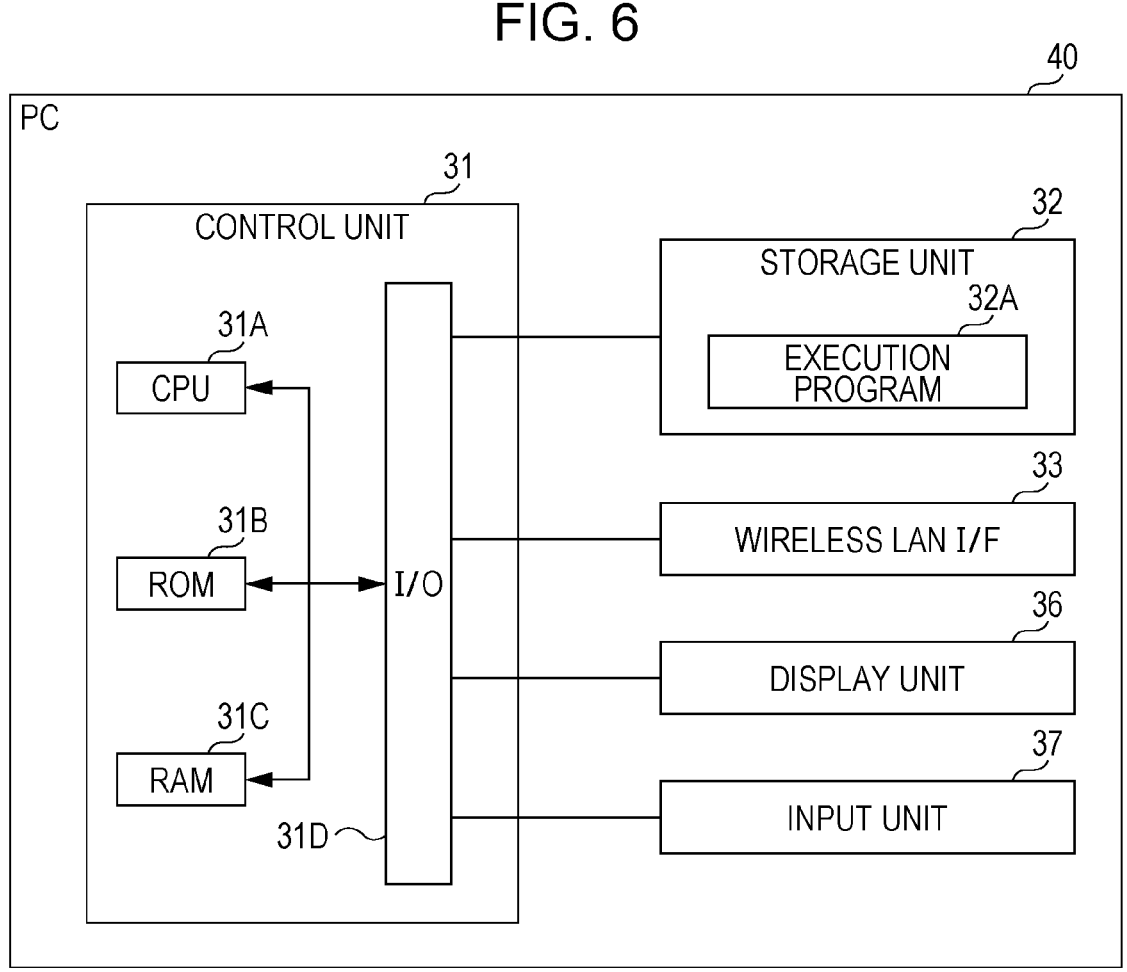
FIG. 6 is a block diagram illustrating a hardware configuration of a PC according to the exemplary embodiment.

FIG. 6 is a block diagram illustrating an example hardware configuration of the PC 40 according to the exemplary embodiment.

Unlike the smartphone 30, the PC 40 of the exemplary embodiment does not include the NFC I/F 34. Specifically, as illustrated in FIG. 6, the PC 40 includes the control unit 31, the storage unit 32, the wireless LAN I/F 33, a display unit 36, and an input unit 37. The control unit 31, the storage unit 32, and the wireless LAN I/F 33 are as described above.

The display unit 36 is a display device, such as an LCD or an organic EL display.

The input unit 37 is an input device, such as a keyboard or a mouse. The display unit 36 of the exemplary embodiment may be formed as a touch panel that is a combination of a touch sensor of a resistive-film type or a capacitive type and the display unit 36.

Figure 7:
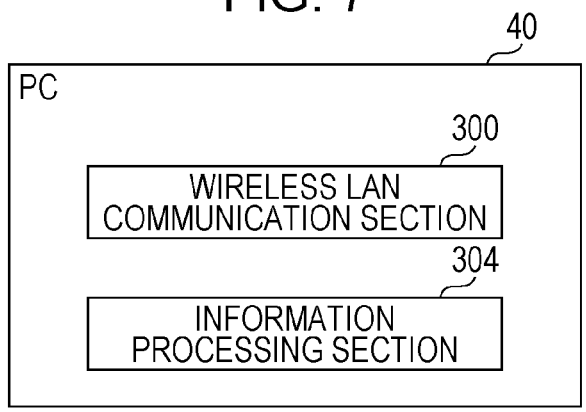
FIG. 7 is a block diagram illustrating an example functional configuration of the PC according to the exemplary embodiment.

FIG. 7 is a block diagram illustrating an example functional configuration of the PC 40 according to the exemplary embodiment. The PC 40 according to the exemplary embodiment functions as the wireless LAN communication section 300 and the information processing section 304 and has a functional configuration the same as that of the smartphone 30 except that the PC 40 does not include the NFC communication section 302. The wireless LAN communication section 300 of the exemplary embodiment has a function of establishing a wireless LAN connection or a tethering connection with the image forming apparatus 20 and the smartphones 30. The information processing section 304 has a function of performing various processes in the PC 40. The PC 40 of the exemplary embodiment is able to establish a tethering connection with at least four terminals. That is, the number of terminals for which the PC 40 allows a tethering connection is larger than the number of terminals for which the image forming apparatus 20 allows a wireless LAN connection.

Flows of Processes

A description is given of the following processes (A) to (F) that are performed among the terminals and the image forming apparatus 20 in the image processing system 10 of the exemplary embodiment.

(A) Wireless LAN Connection Made by Each Terminal with Image Forming Apparatus

First, in a case where the number of connecting terminals 30P is less than three, the following process is performed between the smartphone 30B and the image forming apparatus 20. The smartphone 30B is the requesting terminal 30N before establishment of a wireless LAN connection with the image forming apparatus 20 and becomes the connecting terminal 30P after establishment of the wireless LAN connection. In the following description, this terminal is referred to as the smartphone 30B regardless of whether a wireless LAN connection is established or not yet established. Also in the smartphone 30A, a process similar to that performed in the smartphone 30B is performed with the image forming apparatus 20.

Figure 8:
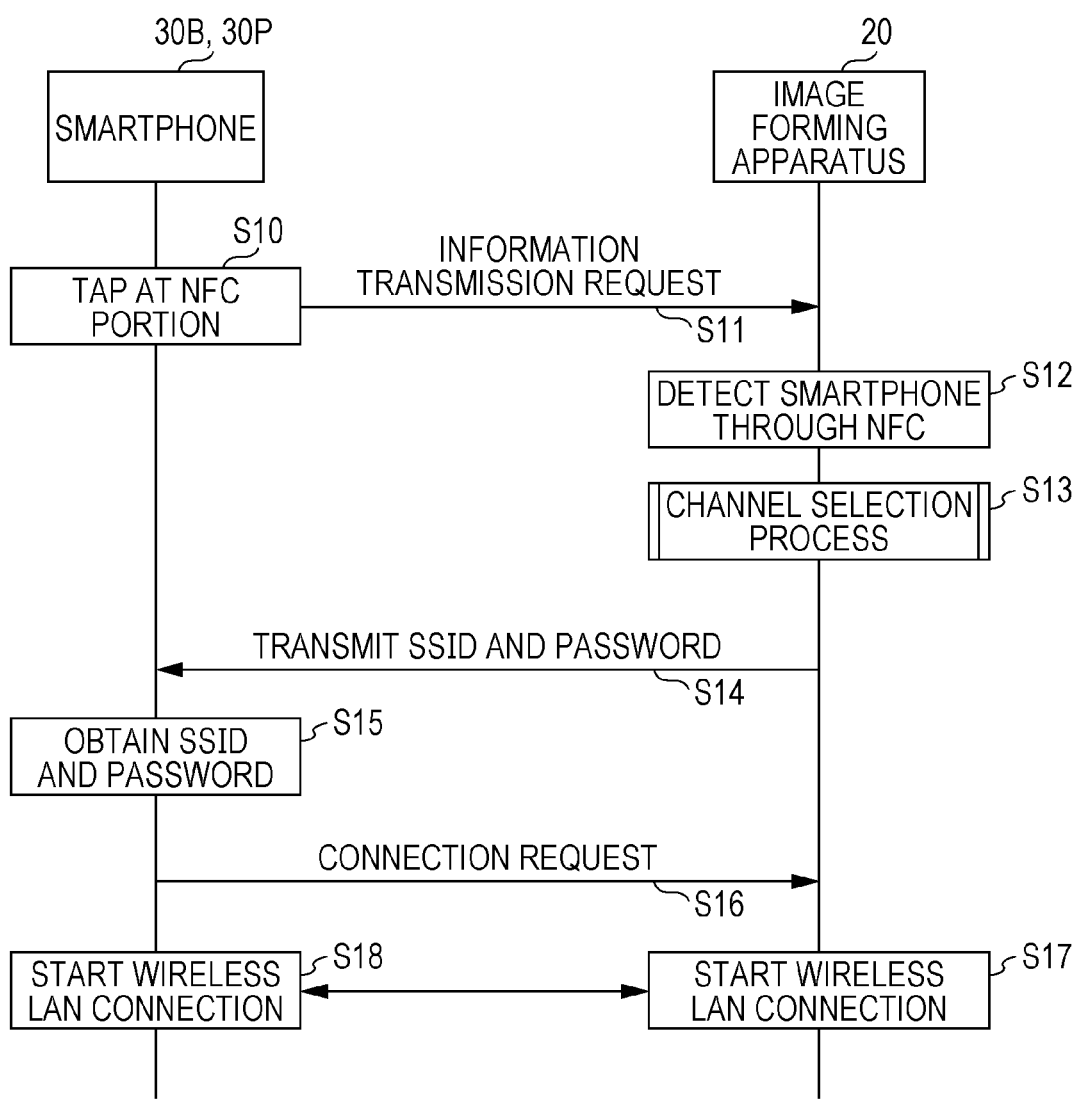
FIG. 8 is a sequence chart illustrating a flow of a process in a case where the smartphone establishes a wireless LAN connection with the image forming apparatus.

In step S10 in FIG. 8, with the smartphone 30B, which is to be the connecting terminal 30P, the image forming apparatus 20 is tapped at the NFC portion 20A.

In step S11, in the smartphone 30B, the CPU 31A makes an information transmission request to the image forming apparatus 20. That is, a command for requesting an SSID and a password is transmitted to the image forming apparatus 20 together with identification information of the smartphone 30B.

In step S12, in the image forming apparatus 20, the CPU 21A detects the smartphone 30B through NFC.

In step S13, in the image forming apparatus 20, the CPU 21A performs a channel selection process. In the description of FIG. 8, it is assumed that a wireless LAN connection is selected in the channel selection process described below. The details of the channel selection process will be described below.

In step S14, in the image forming apparatus 20, the CPU 21A transmits an SSID and a password for making a connection with the image forming apparatus 20 toward the smartphone 30B. The SSID and password are common SSID and password also used in making a connection with the tethering terminal 30T.

In step S15, in the smartphone 30B, the CPU 31A obtains the SSID and password for making a connection with the image forming apparatus 20.

In step S16, in the smartphone 30B, the CPU 31A makes a wireless LAN connection request to the image forming apparatus 20. That is, the CPU 31A uses the SSID and password for making a connection with the image forming apparatus 20 to attempt to make a connection with the image forming apparatus 20 using Wi-Fi Direct.

In step S17, in the image forming apparatus 20, the CPU 21A starts a wireless LAN connection on the basis of the valid SSID and password.

In step S18, in the smartphone 30B, the CPU 31A starts a wireless LAN connection. When step S17 and step S18 are performed, a wireless LAN connection is established between the image forming apparatus 20 and the smartphone 30B (see FIG. 1A).

Next, in the case where the number of connecting terminals 30P is less than three, the following process is performed between the PC 40 and the image forming apparatus 20. The PC 40 is the requesting terminal 30N before establishment of a wireless LAN connection with the image forming apparatus 20 and becomes the connecting terminal 30P after establishment of the wireless LAN connection. In the following description, this terminal is referred to as the PC 40 regardless of whether a wireless LAN connection is established or not yet established.

The PC 40 of the exemplary embodiment does not include the NFC I/F 34, and therefore, the following process is performed in the image forming apparatus 20 in response to the user of the PC 40 operating an input device (not illustrated) of the image forming apparatus 20.

Figure 9:
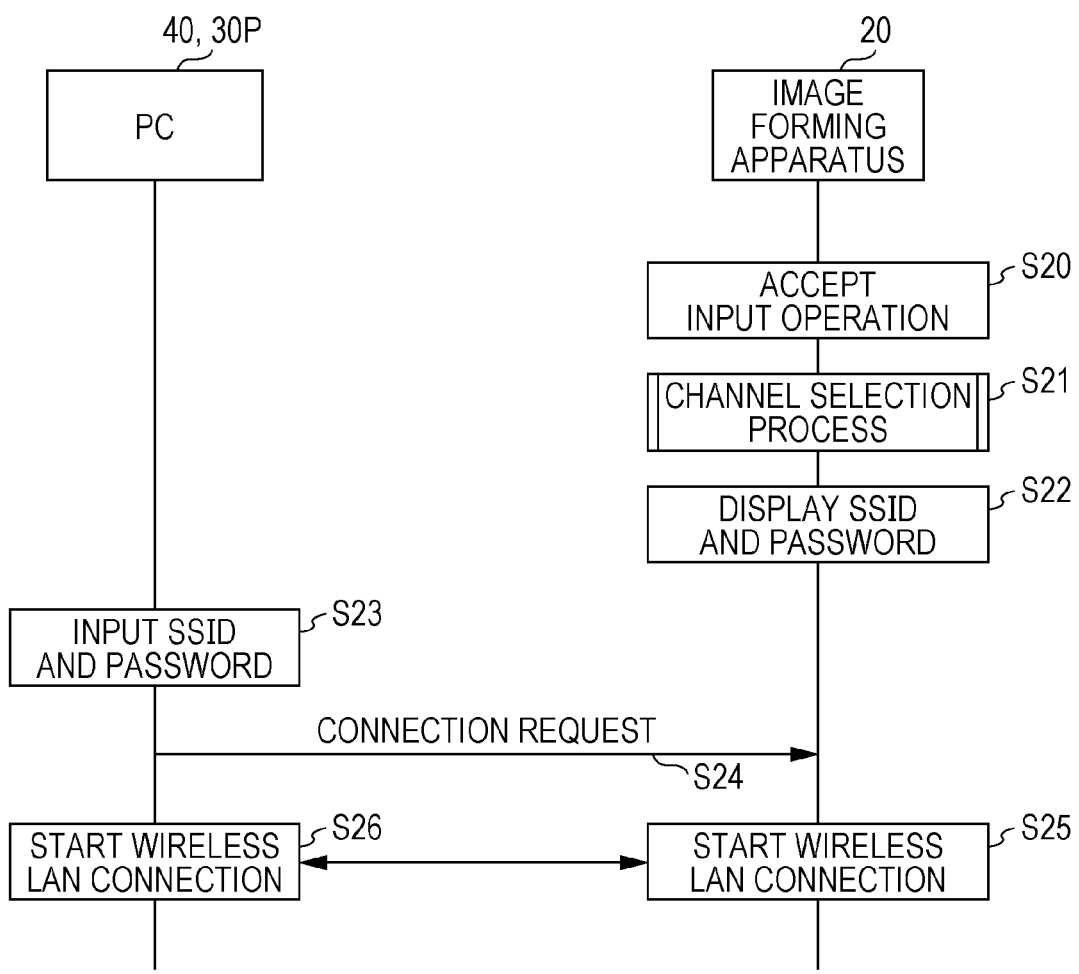
FIG. 9 is a sequence chart illustrating a flow of a process in a case where the PC establishes a wireless LAN connection with the image forming apparatus.

In step S20 in FIG. 9, in the image forming apparatus 20, the CPU 21A accepts the user operation performed on the input device.

In step S21, in the image forming apparatus 20, the CPU 21A performs the channel selection process. In the description of FIG. 9, it is assumed that a wireless LAN connection is selected in the channel selection process described below. The details of the channel selection process will be described below.

In step S22, in the image forming apparatus 20, the CPU 21A displays an SSID and a password that are to be used in making a connection with the image forming apparatus 20 on a display device (not illustrated).

In step S23, in the PC 40, the CPU 31A accepts the SSID and password input through a user operation.

In step S24, in the PC 40, the CPU 31A makes a wireless LAN connection request to the image forming apparatus 20. That is, the CPU 31A uses the SSID and password for making a connection with the image forming apparatus 20 to attempt to make a connection with the image forming apparatus 20 using Wi-Fi Direct.

In step S25, in the image forming apparatus 20, the CPU 21A starts a wireless LAN connection on the basis of the valid SSID and password.

In step S26, in the PC 40, the CPU 31A starts a wireless LAN connection. When step S25 and step S26 are performed, a wireless LAN connection is established between the image forming apparatus 20 and the PC 40 (see FIG. 1A).

(B) Switching from Wireless LAN Connection to Tethering Connection (Roaming)

Figure 10:
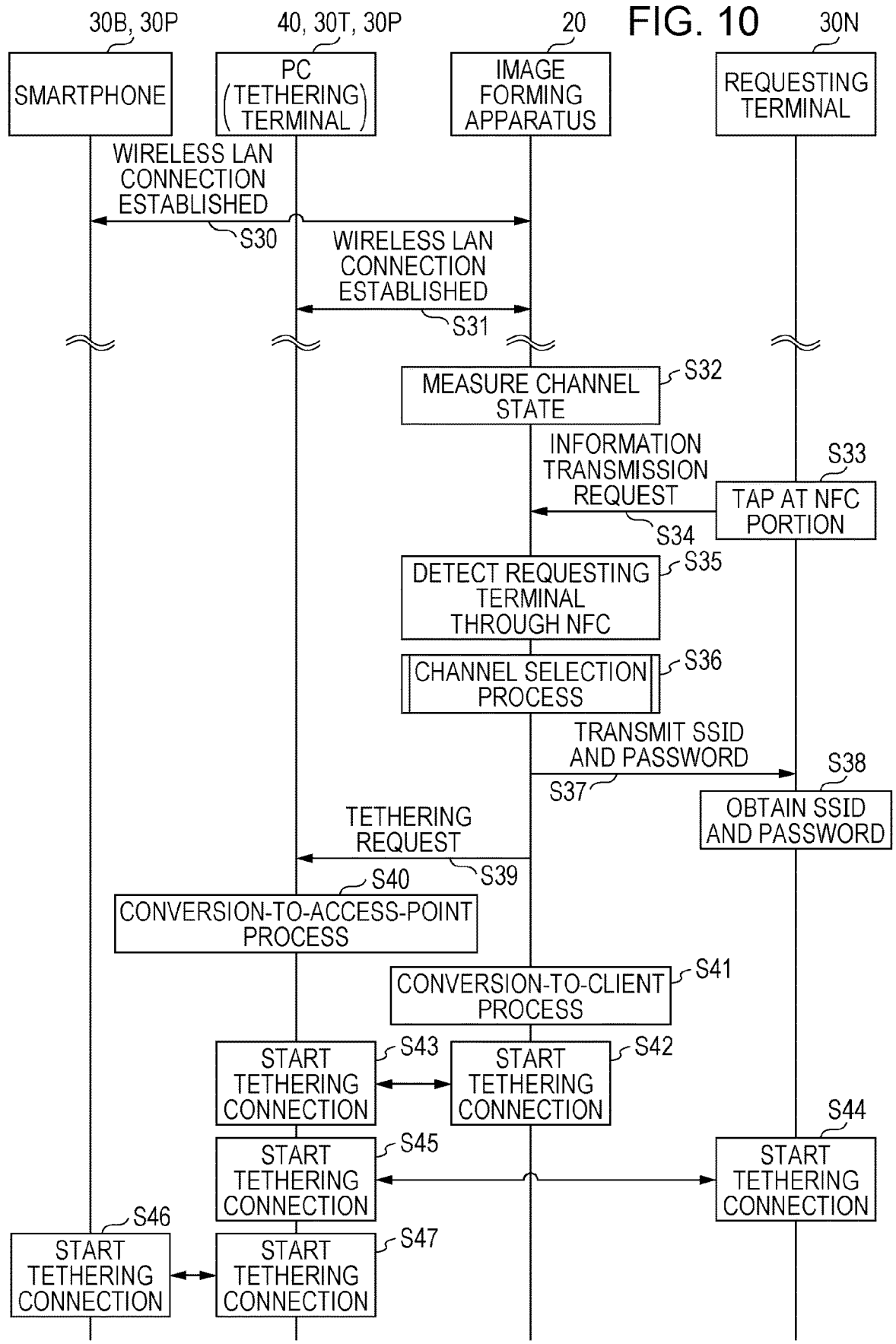
FIG. 10 is a sequence chart illustrating a flow of a process in a case where a requesting terminal, the image forming apparatus, and another terminal establish a tethering connection with a tethering terminal.

Next, a roaming process concerning switching from a wireless LAN connection to a tethering connection in a case where the number of connecting terminals 30P is three or more is described with reference to FIG. 10. In FIG. 10, the smartphone 30A is omitted. The PC 40 is the connecting terminal 30P before the start of a tethering connection and becomes the tethering terminal 30T after the start of the tethering connection. In the following description, this terminal is referred to as the PC 40 regardless of whether a tethering connection is started or not yet started.

As illustrated in FIG. 10, a wireless LAN connection is established between the smartphone 30B, which functions as the connecting terminal 30P, and the image forming apparatus 20 in step S30, and a wireless LAN connection is established between the PC 40 and the image forming apparatus 20 in step S31.

Next, in step S32, in the image forming apparatus 20, the CPU 21A measures the channel state of the wireless LAN connection with each of the connecting terminals 30P (the smartphones 30A and 30B and the PC 40). The measured channel states are kept in the connection information table 22B.

In step S33, with the requesting terminal 30N, the image forming apparatus 20 is tapped at the NFC portion 20A.

In step S34, in the requesting terminal 30N, the CPU 31A makes an information transmission request to the image forming apparatus 20. That is, a command for requesting an SSID and a password is transmitted to the image forming apparatus 20 together with identification information of the requesting terminal 30N.

In step S35, in the image forming apparatus 20, the CPU 21A detects the requesting terminal 30N through NFC.

In step S36, in the image forming apparatus 20, the CPU 21A performs the channel selection process. In the description of FIG. 10, it is assumed that a tethering connection in which the PC 40 functions as the tethering terminal 30T is selected in the channel selection process described below. The details of the channel selection process will be described below.

In step S37, in the image forming apparatus 20, the CPU 21A transmits an SSID and a password for making a connection with the image forming apparatus 20 toward the requesting terminal 30N. The SSID and password are common SSID and password also used in making a connection with the PC 40.

In step S38, in the requesting terminal 30N, the CPU 31A obtains the SSID and password for making a connection with the image forming apparatus 20.

In step S39, in the image forming apparatus 20, the CPU 21A makes a tethering request to the PC 40. That is, a command for starting a tethering connection in which the PC 40 functions as an access point is transmitted.

In step S40, in the PC 40, the CPU 31A preforms a conversion-to-access-point process. Accordingly, the wireless LAN connection with the image forming apparatus 20 is terminated, and a tethering connection in which the PC 40 functions as an access point is made available.

In step S41, in the image forming apparatus 20, the CPU 21A performs the conversion-to-client process. Accordingly, the CPU 21A decreases the radio field intensity of the wireless LAN connection over time and stops the wireless LAN connection. Consequently, the image forming apparatus 20 is able to make a tethering connection with the PC 40 as a client.

In step S42, in the image forming apparatus 20, the CPU 21A starts a tethering connection on the basis of an SSID and a password the same as those for a wireless LAN connection by the image forming apparatus 20.

In step S43, in the PC 40, the CPU 31A starts a tethering connection. When step S42 and step S43 are performed, a tethering connection is established between the image forming apparatus 20 and the PC 40 (see FIG. 1B). The image forming apparatus 20 statically sets the Internet Protocol (IP) address so that the IP address does not change after the start of the tethering connection.

In step S44, in the requesting terminal 30N, the CPU 31A starts a tethering connection on the basis of an SSID and a password the same as those for a wireless LAN connection by the image forming apparatus 20. The IP address of the image forming apparatus 20 set for the wireless LAN connection remains unchanged, and therefore, the requesting terminal 30N is able to communicate with the image forming apparatus 20 through the tethering connection without resetting.

In step S45, in the PC 40, the CPU 31A starts a tethering connection. When step S44 and step S45 are performed, a tethering connection is established between the requesting terminal 30N and the PC 40 (see FIG. 1B).

In step S46, in the smartphone 30B, the CPU 31A starts a tethering connection on the basis of an SSID and a password the same as those for a wireless LAN connection by the image forming apparatus 20. The IP address of the image forming apparatus 20 set for the wireless LAN connection remains unchanged, and therefore, the smartphone 30B is able to communicate with the image forming apparatus 20 through the tethering connection without resetting.

In step S47, in the PC 40, the CPU 31A starts a tethering connection. When step S46 and step S47 are performed, a tethering connection is established between the connecting terminal 30P (smartphone 30B) and the PC 40 (see FIG. 1B).

(C) Channel Selection Process Based on Difference in the Number of Connecting Terminals Next, the channel selection process concerning step S13, step S21, and step S36 performed in the image forming apparatus 20 is described.

Figure 11:
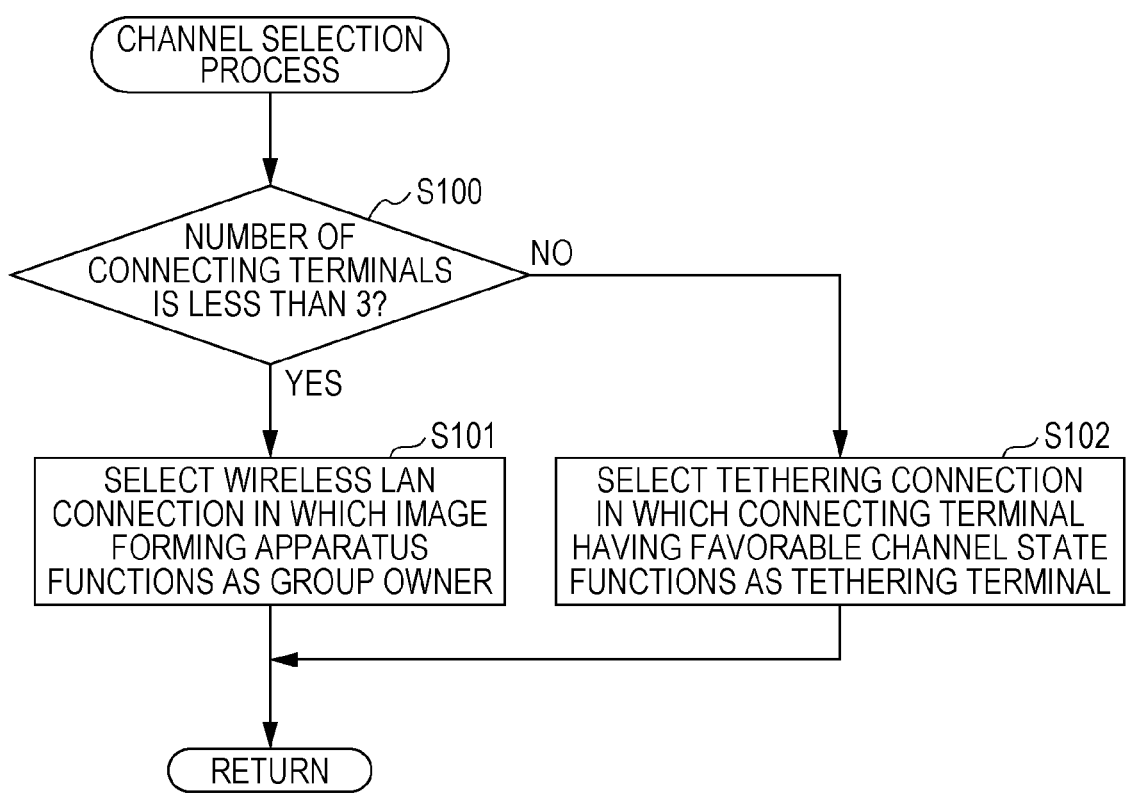
FIG. 11 is a flowchart illustrating a flow of a channel selection process that is performed in the image forming apparatus.

In step S100 in FIG. 11, the CPU 21A determines whether the number of connecting terminals 30P for which a wireless LAN connection with the image forming apparatus 20 is established is less than the upper limit number, that is, less than three. In a case where a tethering connection is already made, the CPU 21A determines whether the number of terminals requesting a connection in a case of making a wireless LAN connection with the image forming apparatus 20 is less than three. In a case where the CPU 21A determines that the number of connecting terminals 30P is less than three, the process proceeds to step S101. On the other hand, in a case where the CPU 21A determines that the number of connecting terminals 30P is not less than three, that is, the number of connecting terminals 30P is three or more, the process proceeds to step S102.

In step S101, the CPU 21A selects, as the channel, a wireless LAN connection in which the image forming apparatus 20 functions as a group owner. The CPU 21A ends the channel selection process.

In step S102, the CPU 21A refers to the connection information table 22B and selects a tethering connection in which the connecting terminal 30P having the most favorable channel state functions as the tethering terminal 30T. In the example of the exemplary embodiment, the channel state of the PC 40 is more favorable than those of the smartphones 30A and 30B, and therefore, a tethering connection in which the PC 40 functions as the tethering terminal 30T is selected. The CPU 21A ends the channel selection process.

(D) Process in Case of Image Forming from Requesting Terminal

Next, a flow of an image forming process based on a print job from the requesting terminal 30N for which a tethering connection is established is described.

Figure 12:
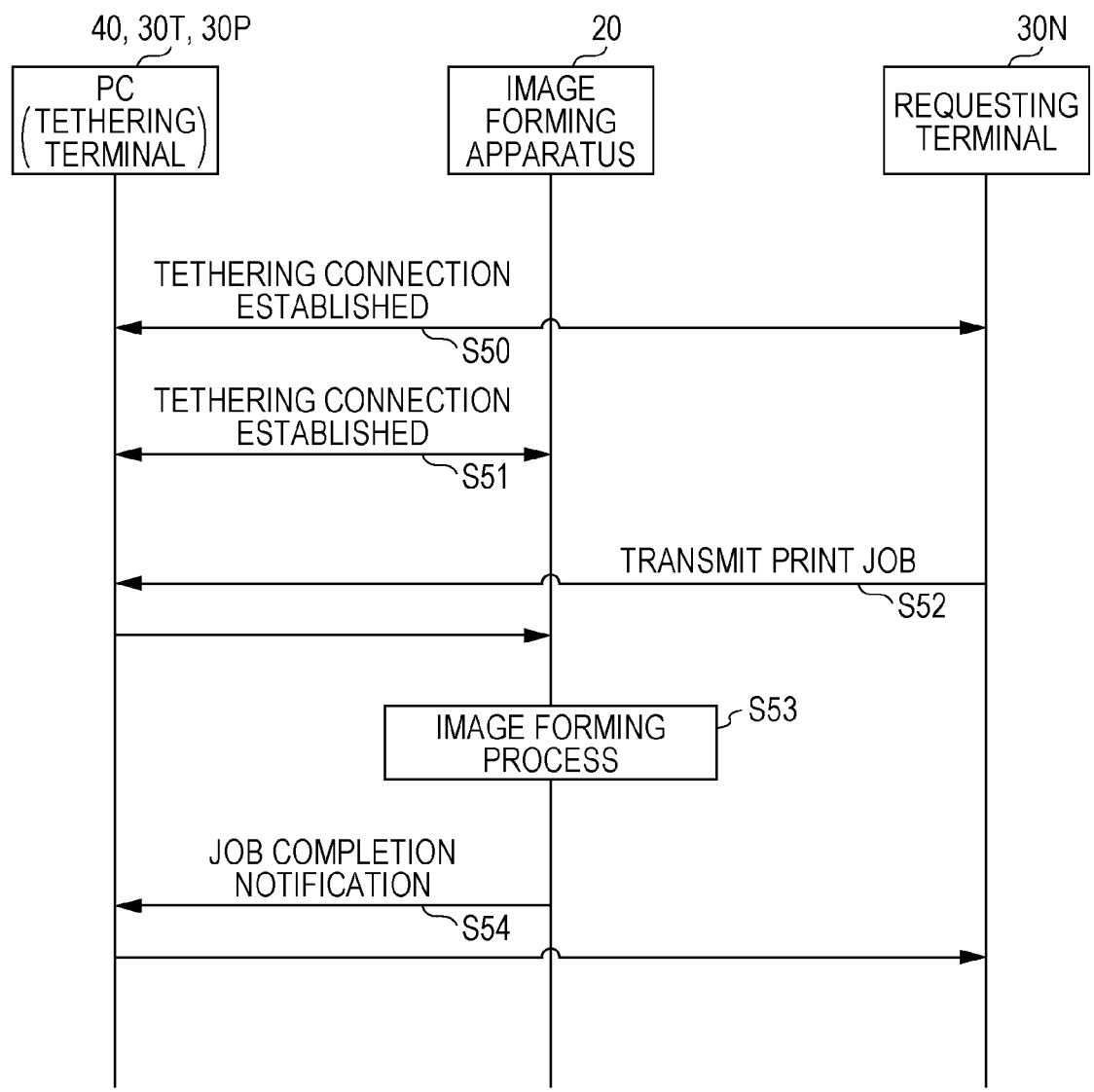
FIG. 12 is a sequence chart illustrating a flow of a process in a case where imaging forming is performed from a requesting terminal.

In FIG. 12, a tethering connection is established between the PC 40, which is the tethering terminal 30T, and the requesting terminal 30N in step S50, and a tethering connection is established between the PC 40 and the image forming apparatus 20 in step S51.

In step S52, in the requesting terminal 30N, the CPU 31A transmits a print job. This print job is transmitted to the image forming apparatus 20 via the PC 40.

In step S53, in the image forming apparatus 20, the CPU 21A performs an image forming process on the basis of the print job.

In step S54, in the image forming apparatus 20, the CPU 21A transmits a job completion notification toward the requesting terminal 30N after completion of the image forming process. This job completion notification is transmitted to the requesting terminal 30N via the PC 40. Then, the process concerning image forming ends.

The image forming apparatus 20 of the exemplary embodiment is configured so that channel switching, that is, roaming, is not performed during transmission of a print job. However, the configuration is not limited to this, and roaming may be performed during transmission of a print job. In this case, in the image processing system 10, a process in one of the following cases is performed.

In a first case, when a terminal detects roaming, the terminal suspends transmission of a print job toward the image forming apparatus 20 and resumes the transmission after communication with the image forming apparatus 20 is resumed. In a case where reception of the print job is suspended, the image forming apparatus 20 saves part of the print job that has been received, combines the remaining part of the print job received via the PC 40 with the previously received part, and performs an image forming process.

In a second case, when a terminal detects roaming, the terminal terminates transmission of a print job toward the image forming apparatus 20 and retransmits the print job from scratch after communication with the image forming apparatus 20 is resumed. In a case where reception of the print job is terminated in the middle of reception, the image forming apparatus 20 deletes part of the print job that has been received, and performs an image forming process on the basis of the print job retransmitted via the PC 40.

(E) First Roaming Example in Case of Decrease in Radio Field Intensity of Tethering Connection Next, a description is given of an example case where, in a case where the radio field intensity of the PC 40, which is the tethering terminal 30T, decreases, another terminal is set as the tethering terminal 30T to perform roaming.

Figure 13:
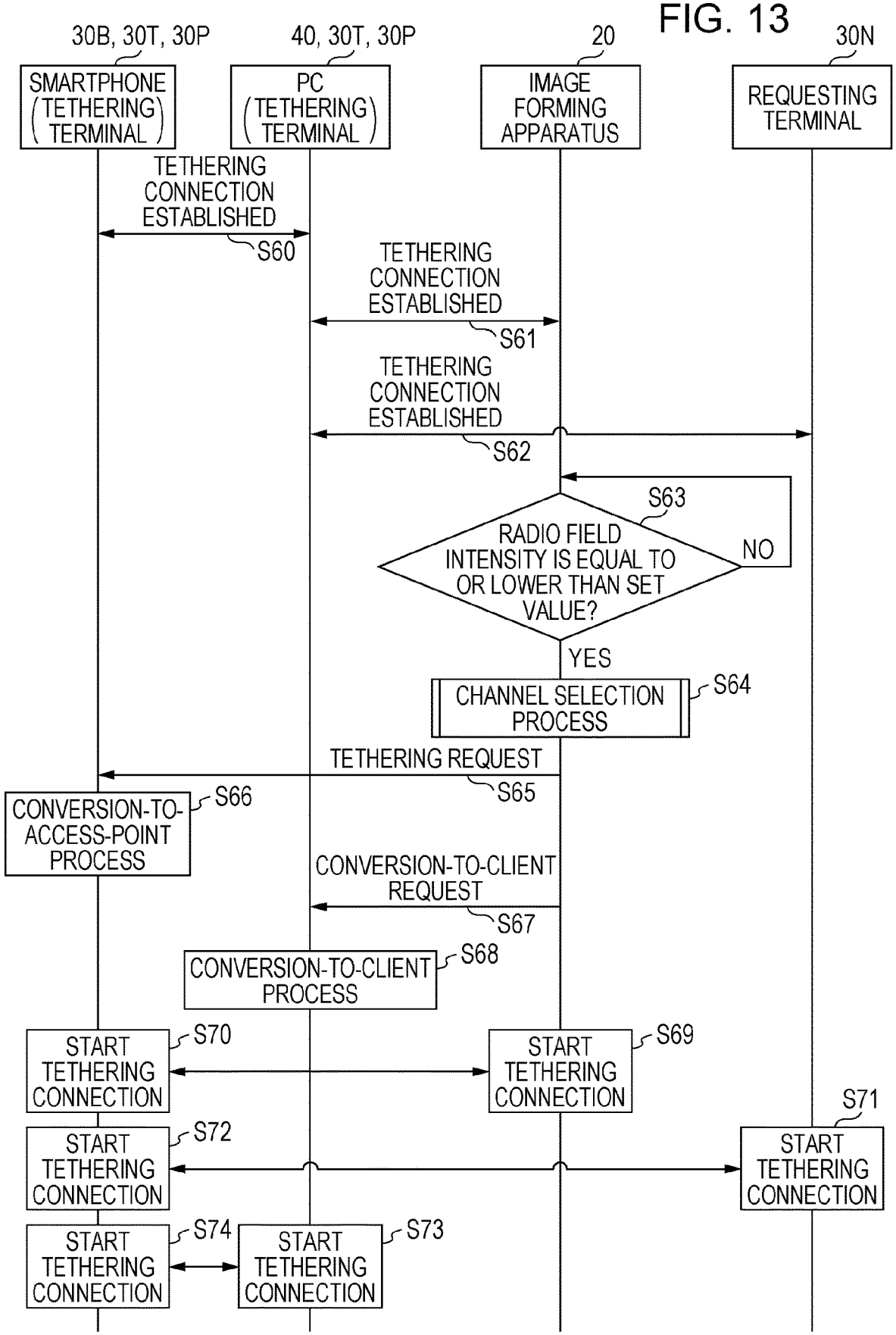
FIG. 13 is a sequence chart illustrating example roaming in a case where the radio field intensity of a tethering connection decreases.

As illustrated in FIG. 13, in step S60, a tethering connection is established between the smartphone 30B, which functions as the connecting terminal 30P, and the PC 40, which is the tethering terminal 30T. Further, a tethering connection is established between the image forming apparatus 20 and the PC 40 in step S61, and a tethering connection is established between the requesting terminal 30N and the PC 40 in step S62.

In step S63, in the image forming apparatus 20, the CPU 21A determines whether the radio field intensity of the tethering connection with the PC 40 is equal to or lower than a predetermined set value. In a case where the CPU 21A determines that the radio field intensity of the tethering connection is equal to or lower than the set value, the process proceeds to step S64. On the other hand, in a case where the CPU 21A determines that the radio field intensity of the tethering connection is not equal to or lower than the set value, step S63 is repeated.

In step S64, in the image forming apparatus 20, the CPU 21A performs the channel selection process. In the description of FIG. 13, it is assumed that a tethering connection in which the smartphone 30B functions as the tethering terminal 30T is selected in the channel selection process.

In step S65, in the image forming apparatus 20, the CPU 21A makes a tethering request to the smartphone 30B, which newly functions as the tethering terminal 30T. That is, a command for starting a tethering connection in which the smartphone 30B functions as an access point is transmitted.

In step S66, in the smartphone 30B, the CPU 31A performs a conversion-to-access-point process. Accordingly, the tethering connection with the PC 40 is terminated, and a tethering connection in which the smartphone 30B functions as an access point is made available.

In step S67, in the image forming apparatus 20, the CPU 21A makes a conversion-to-client request to the PC 40. That is, a command for converting the PC 40 to a client is transmitted.

In step S68, in the PC 40, the CPU 31A performs the conversion-to-client process. Accordingly, the CPU 31A decreases the radio field intensity of the tethering connection over time and stops the tethering connection by the PC 40.

Consequently, the PC 40 is able to make a tethering connection with the smartphone 30B as a client.

In step S69, in the image forming apparatus 20, the CPU 21A starts a tethering connection on the basis of an SSID and a password the same as those for a wireless LAN connection by the image forming apparatus 20.

In step S70, in the smartphone 30B, the CPU 31A starts a tethering connection. When step S69 and step S70 are performed, a tethering connection is established between the image forming apparatus 20 and the smartphone 30B. The image forming apparatus 20 continues statically setting the IP address so that the IP address does not change after the tethering terminal 30T is changed.

In step S71, in the requesting terminal 30N, the CPU 31A starts a tethering connection on the basis of an SSID and a password the same as those for a wireless LAN connection by the image forming apparatus 20. That is, the IP address set in the image forming apparatus 20 remains unchanged in the tethering connection by the smartphone 30B, and therefore, the requesting terminal 30N is able to communicate with the image forming apparatus 20 through the tethering connection without resetting.

In step S72, in the smartphone 30B, the CPU 31A starts a tethering connection. When step S71 and step S72 are performed, a tethering connection is established between the requesting terminal 30N and the smartphone 30B.

In step S73, in the PC 40, the CPU 31A starts a tethering connection on the basis of an SSID and a password the same as those for a wireless LAN connection by the image forming apparatus 20. The IP address set in the image forming apparatus 20 remains unchanged in the tethering connection by the smartphone 30B, and therefore, the PC 40 is able to communicate with the image forming apparatus 20 through the tethering connection without resetting.

In step S74, in the smartphone 30B, the CPU 31A starts a tethering connection. When step S73 and step S74 are performed, a tethering connection is established between the PC 40 and the smartphone 30B.

(F) Second Roaming Example in Case of Decrease in Radio Field Intensity of Tethering Connection Next, a description is given of an example case where, in the case where the radio field intensity of the PC 40, which is the tethering terminal 30T, decreases, the tethering connection is terminated and the wireless LAN connection is resumed.

As illustrated in FIG. 14, in step S80, a tethering connection is established between the smartphone 30B, which functions as the connecting terminal 30P, and the PC 40, which is the tethering terminal 30T. Further, a tethering connection is established between the image forming apparatus 20 and the PC 40 in step S81, and a tethering connection is established between the requesting terminal 30N and the PC 40 in step S82.

In step S83, in the image forming apparatus 20, the CPU 21A determines whether the radio field intensity of the tethering connection with the PC 40 is equal to or lower than the predetermined set value. In a case where the CPU 21A determines that the radio field intensity of the tethering connection is equal to or lower than the set value, the process proceeds to step S84. On the other hand, in a case where the CPU 21A determines that the radio field intensity of the tethering connection is not equal to or lower than the set value, step S83 is repeated.

In step S84, in the image forming apparatus 20, the CPU 21A performs the channel selection process. In the description of FIG. 14, it is assumed that a wireless LAN connection is selected in the channel selection process. In this case, it is supposed that the connection between the smartphone 30A and the image forming apparatus 20 has been cancelled and the number of terminals attempting to make a connection with the image forming apparatus 20 is less than three.

In step S85, in the image forming apparatus 20, the CPU 21A performs a conversion-to-group-owner process. The conversion-to-group-owner process is a process in which the image forming apparatus 20 stops receiving provision of the tethering connection from the PC 40 as a client and starts provision of a wireless LAN connection as a router. Accordingly, the tethering connection with the PC 40 is terminated, and a wireless LAN connection in which the image forming apparatus 20 functions as a group owner is made available.

In step S86, in the image forming apparatus 20, the CPU 21A makes a conversion-to-client request to the PC 40. That is, a command for converting the PC 40 to a client is transmitted.

In step S87, in the PC 40, the CPU 31A performs the conversion-to-client process. Accordingly, the CPU 31A decreases the radio field intensity of the tethering connection over time and stops the tethering connection by the PC 40. Consequently, the PC 40 is able to make a wireless LAN connection with the image forming apparatus 20 as a client.

In step S88, in the PC 40, the CPU 31A starts a wireless LAN connection on the basis of an SSID and a password the same as those for a wireless LAN connection by the image forming apparatus 20.

In step S89, in the image forming apparatus 20, the CPU 21A starts a wireless LAN connection. When step S88 and step S89 are performed, a wireless LAN connection is established between the image forming apparatus 20 and the PC 40. The image forming apparatus 20 continues statically setting the IP address so that the IP address does not change after the tethering connection is stopped.

In step S90, in the requesting terminal 30N, the CPU 31A starts a wireless LAN connection on the basis of an SSID and a password the same as those for a wireless LAN connection by the image forming apparatus 20. The IP address set in the image forming apparatus 20 for the first wireless LAN connection remains unchanged, and therefore, the requesting terminal 30N is able to communicate with the image forming apparatus 20 through the wireless LAN connection without resetting.

In step S91, in the image forming apparatus 20, the CPU 21A starts a wireless LAN connection. When step S90 and step S91 are performed, a wireless LAN connection is established between the image forming apparatus 20 and the requesting terminal 30N.

In step S92, in the smartphone 30B, the CPU 31A starts a wireless LAN connection on the basis of an SSID and a password the same as those for a wireless LAN connection by the image forming apparatus 20. The IP address set in the image forming apparatus 20 for the first wireless LAN connection remains unchanged, and therefore, the smartphone 30B is able to communicate with the image forming apparatus 20 through the wireless LAN connection without resetting.

In step S93, in the image forming apparatus 20, the CPU 21A starts a wireless LAN connection. When step S92 and step S93 are performed, a wireless LAN connection is established between the image forming apparatus 20 and the smartphone 30B.

CONCLUSION

As in the image forming apparatus 20 of the exemplary embodiment, an upper limit may be set for the number of terminals that are allowed to make a wireless LAN connection with the connection management apparatus. Once a wireless LAN connection is established with a terminal, the wireless LAN connection may be maintained without disconnection even if the use of the image forming apparatus 20 ends, or a reconnection may be made after disconnection regardless of the user's intention by using an SSID and a password saved in the terminal. Therefore, a terminal attempting to newly make a wireless LAN connection with the image forming apparatus 20 that already establishes a wireless LAN connection with the upper limit number of terminals fails to make a connection.

The image forming apparatus 20 of the exemplary embodiment is configured so that, in a case where the number of connecting terminals 30P reaches the upper limit, at least one of the connecting terminals 30P is set as the tethering terminal 30T to enable the other terminals including the image forming apparatus 20 and the requesting terminal 30N to make a tethering connection. In a case where the number of terminals for which a tethering connection is allowed by the tethering terminal 30T is larger than the number of terminals for which a wireless LAN connection is allowed, a terminal that allows an adequate number of terminals to be connected is set as the tethering terminal 30T, so that the number of terminals that are allowed to be connected to the image forming apparatus 20 increases. That is, when a terminal that allows an adequate number of terminals to be connected is set as the tethering terminal 30T, the requesting terminal 30N is able to join the network N3 in which a tethering connection with the image forming apparatus 20 is made.

The image forming apparatus 20 is configured so that, at the time of establishing a tethering connection by the tethering terminal 30T, an SSID and a password the same as an SSID and a password for establishing a wireless LAN connection are used. Therefore, the connecting terminal 30P that is connected to the network N1, which is a wireless LAN connection with the image forming apparatus 20, is able to seamlessly switch to the network N3 with certainty by using roaming without any special instruction.

In particular, in the connection information table 22B, a channel state based on the above-described conditions (1) to (4) is set. Accordingly, a tethering connection is made in a connection state better than that in a case where the channel states of the connecting terminals are not quantified. For example, in a case where a terminal having the highest radio field intensity is selected as the tethering terminal 30T, a tethering connection that is less likely to be lost is provided. For example, in a case where a terminal having the highest communication speed is selected as the tethering terminal 30T, a tethering connection having a high communication speed is provided. For example, in a case where a terminal that allows a tethering connection for the largest number of terminals is selected as the tethering terminal 30T, a larger number of terminals are able to make a connection with the network N3, which is a tethering connection.

The exemplary embodiment has a configuration in which, in a case where a tethering connection in which the PC 40 functions as the tethering terminal 30T is started, and thereafter, the radio field intensity of the tethering connection decreases to a predetermined value or lower, roaming to another network is performed. Specifically, there are possible cases, namely, a case where the tethering connection of the network N3 is terminated and roaming to the network N1 by the image forming apparatus 20 is performed, and a case where roaming to a network in which another terminal functions as the tethering terminal 30T is performed.

As described above, with the image forming apparatus 20 of the exemplary embodiment, it is possible to provide a stable network environment without instantaneous disconnection of communication unlike in a case where the tethering connection is terminated without roaming or a case where switching of the tethering terminal is not performed.

In a case where a tethering connection between the image forming apparatus 20 and the tethering terminal 30T is suddenly lost for some reason before roaming is performed in accordance with control by the image forming apparatus 20, the following process is performed. In the image forming apparatus 20, the above-described conversion-to-group-owner process in step S85 is performed, and the network N1 is reconfigured. In the tethering terminal 30T, the above-described conversion-to-client process in step S68 is performed without an instruction from the image forming apparatus 20, and the tethering connection is terminated. Accordingly, even in the case where a tethering connection is suddenly lost, the other terminals switch from the tethering connection to a wireless LAN connection without any special instruction because the SSID and password for the tethering connection are common SSID and password also used in the wireless LAN connection.

Remarks

In the exemplary embodiment, for example, the image forming apparatus 20 has been described as the connection management apparatus; however, the connection management apparatus is not limited to this and may be a PC, a network television, a video recorder, or the like. In the exemplary embodiment described above, for example, the smartphones 30 and the PC 40 have been described as terminals connected to the image forming apparatus 20; however, such terminals are not limited to these. Terminals that are able to be connected to the image forming apparatus 20 include portable terminals, such as a tablet terminal, a wearable terminal, and a digital camera.

The exemplary embodiment may be implemented in a form of a program that causes a computer to execute the functions of the sections included in the image forming apparatus 20. Further, the exemplary embodiment may be implemented in a form of a program that causes a computer to execute the functions of the sections included in each of the smartphone 30 and the PC 40. The programs in the exemplary embodiment may be stored in a non-transitory computer readable storage medium, such as a compact disc read-only memory (CD-ROM), a digital versatile disc read-only memory (DVD-ROM), or a universal serial bus (USB) memory, or may be received from an external server.

In the exemplary embodiment, the case has been described where the programs are executed so that the processes concerning the exemplary embodiment are implemented with a software configuration by using a computer; however, the exemplary embodiment is not limited to this. The exemplary embodiment may be implemented with, for example, a hardware configuration or a combination of a hardware configuration and a software configuration.

The flows of processes described in the exemplary embodiment are examples. Any step may be deleted, a new step may be added, or the order of steps may be changed without departing from the spirit.

The present disclosure is not limited to the above-described exemplary embodiment, and various modifications and applications are possible without departing from the spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A connection management apparatus comprising:
an accepting section that accepts an information transmission request from a requesting terminal that is a terminal requesting a wireless LAN connection;
a transmitting section that transmits, to the requesting terminal, connection information for establishing a wireless LAN connection in response to the information transmission request;
a connecting section that has a capability of establishing a wireless LAN connection with a predetermined upper limit number of terminals; and
a control section that, in a case where the number of connecting terminals that are terminals connected via the wireless LAN connection reaches the upper limit number, causes a connecting terminal among the connecting terminals to function as a tethering terminal and terminates the wireless LAN connection established by the connecting section, the tethering terminal being a terminal that provides a tethering connection using connection information the same as the connection information for establishing the wireless LAN connection with the connecting section by the connecting terminal.

2. The connection management apparatus according to claim 1, wherein
in a case of terminating the wireless LAN connection established by the connecting section, the control section decreases a radio field intensity of the wireless LAN connection over time.

3. The connection management apparatus according to claim 1, further comprising
a measurement section that measures a channel state of each connecting terminal among the connecting terminals, wherein
in a case where the number of connecting terminals reaches the upper limit number, the control section causes a connecting terminal for which the channel state measured by the measurement section is most favorable among the connecting terminals to function as the tethering terminal.

4. The connection management apparatus according to claim 2, further comprising
a measurement section that measures a channel state of each connecting terminal among the connecting terminals, wherein
in a case where the number of connecting terminals reaches the upper limit number, the control section causes a connecting terminal for which the channel state measured by the measurement section is most favorable among the connecting terminals to function as the tethering terminal.

5. The connection management apparatus according to claim 3, wherein
the connecting terminal is allowed to establish a tethering connection in a case where the connecting terminal provides at least one of the following channel states; a tethering connection, a distance to the connecting terminal, a radio field intensity of a wireless LAN connection with the connecting terminal, and a communication speed of the wireless LAN connection with the connecting terminal.

6. The connection management apparatus according to claim 4, wherein
the connecting terminal is allowed to establish a tethering connection in a case where the connecting terminal provides at least one of the following channel states; a tethering connection, a distance to the connecting terminal, a radio field intensity of a wireless LAN connection with the connecting terminal, and a communication speed of the wireless LAN connection with the connecting terminal.

7. The connection management apparatus according to claim 1, wherein
during a period in which information is being received via the connecting section, the control section does not start or stop causing the connecting terminal to function as the tethering terminal.

8. The connection management apparatus according to claim 2, wherein
during a period in which information is being received via the connecting section, the control section does not start or stop causing the connecting terminal to function as the tethering terminal.

9. The connection management apparatus according to claim 3, wherein
during a period in which information is being received via the connecting section, the control section does not start or stop causing the connecting terminal to function as the tethering terminal.

10. The connection management apparatus according to claim 4, wherein
during a period in which information is being received via the connecting section, the control section does not start or stop causing the connecting terminal to function as the tethering terminal.

11. The connection management apparatus according to claim 5, wherein
during a period in which information is being received via the connecting section, the control section does not start or stop causing the connecting terminal to function as the tethering terminal.

12. The connection management apparatus according to claim 6, wherein
during a period in which information is being received via the connecting section, the control section does not start or stop causing the connecting terminal to function as the tethering terminal.

13. The connection management apparatus according to claim 1, wherein
in a case where a radio field intensity of the tethering connection provided by the tethering terminal decreases to a predetermined value or lower, the control section terminates the tethering connection provided by the tethering terminal, or replaces the tethering terminal currently providing the tethering connection by another terminal connected to the tethering connection and causes the other terminal to function as a new tethering terminal, and in a case where the tethering connection provided by the tethering terminal is terminated, the connecting section starts the wireless LAN connection.

14. The connection management apparatus according to claim 13, wherein
in a case where the control section terminates the tethering connection provided by the tethering terminal or in a case where the control section causes the other terminal to function as the new tethering terminal, the control section makes the radio field intensity of the tethering connection provided by the tethering terminal decrease over time.

15. A non-transitory computer readable medium storing a program causing a computer to execute a process for connection management, the computer including a connecting section having a capability of establishing a wireless LAN connection with a predetermined upper limit number of terminals, the process comprising:
accepting an information transmission request from a requesting terminal that is a terminal requesting a wireless LAN connection;
transmitting, to the requesting terminal, connection information for establishing a wireless LAN connection in response to the information transmission request; and
in a case where the number of connecting terminals that are terminals connected via the wireless LAN connection reaches the upper limit number, causing a connecting terminal among the connecting terminals to function as a tethering terminal and terminating the wireless LAN connection established by the connecting section, the tethering terminal being a terminal that provides a tethering connection using connection information the same as the connection information for establishing the wireless LAN connection with the connecting section by the connecting terminal.

16. A connection management apparatus comprising:
accepting means for accepting an information transmission request from a requesting terminal that is a terminal requesting a wireless LAN connection;
transmitting means for transmitting, to the requesting terminal, connection information for establishing a wireless LAN connection in response to the information transmission request;
connecting means having a capability of establishing a wireless LAN connection with a predetermined upper limit number of terminals; and
controlling means for, in a case where the number of connecting terminals that are terminals connected via the wireless LAN connection reaches the upper limit number, causing a connecting terminal among the connecting terminals to function as a tethering terminal and terminating the wireless LAN connection established by the connecting means, the tethering terminal being a terminal that provides a tethering connection using connection information the same as the connection information for establishing the wireless LAN connection with the connecting means by the connecting terminal.

* * * * *